(12) United States Patent
Hoffman

(10) Patent No.: US 6,179,380 B1
(45) Date of Patent: Jan. 30, 2001

(54) ANTI BLAST SEAT ASSEMBLY WITH KNEE PROTECTION MECHANISM

(75) Inventor: Steven L. Hoffman, Livingston County, MI (US)

(73) Assignee: The United States of America as represented by the Secretary of the Army, Washington, DC (US)

( * ) Notice: Under 35 U.S.C. 154(b), the term of this patent shall be extended for 0 days.

(21) Appl. No.: 09/335,819

(22) Filed: Jun. 18, 1999

(51) Int. Cl.⁷ ........................................... B60N 2/427
(52) U.S. Cl. ............................. 297/216.17; 297/216.1
(58) Field of Search ..................... 297/216.1, 216.16, 297/216.15, 216.19, 216.2, 423.27, 423.3; 296/65.02, 68.1

(56) References Cited

U.S. PATENT DOCUMENTS

| | | | |
|---|---|---|---|
| 156,004 | * 10/1874 | Wayland | 297/423.3 |
| 205,059 | * 6/1878 | Dann et al. | 297/423.3 |
| 1,067,914 | * 7/1913 | Giasson | 297/423.3 X |
| 2,401,748 | * 6/1946 | Dillon | 297/216.16 X |
| 2,514,447 | * 7/1950 | Hendrickson | 297/423.27 |
| 2,725,921 | * 12/1955 | Markin | 297/216.15 G |
| 2,796,112 | * 6/1957 | Barsky | 297/216.1 |
| 2,935,123 | * 5/1960 | Lloyd-Young | 297/423.3 X |
| 3,446,469 | * 5/1969 | Whitten | 297/216.1 X |
| 4,008,917 | * 2/1977 | Sigwarth et al. | 297/216.1 X |
| 4,784,434 | * 11/1988 | Iwami | 297/216.1 |
| 5,662,376 | * 9/1997 | Breuer et al. | 297/216.2 |
| 6,042,190 | * 3/2000 | Mathe et al. | 297/216.15 X |

FOREIGN PATENT DOCUMENTS

| | | | |
|---|---|---|---|
| 830902 | * 2/1952 | (DE) | 297/216.19 |
| 358053525 | * 3/1983 | (JP) | 297/216.1 |
| 401275230 | * 11/1989 | (JP) | 297/216.1 |
| 1161419 | * 6/1985 | (RU) | 297/216.2 |

* cited by examiner

Primary Examiner—Peter R. Brown
(74) Attorney, Agent, or Firm—Peter A. Taucher; David L. Kuhn

(57) ABSTRACT

A vehicle designed to survive mines exploding underneath it has an impact absorbing seat assembly for holding a human occupant of the vehicle. The assembly includes a seat having lower and upper seat members and includes a mechanism connected to the floor and the seat for absorbing the impact of the vehicle floor's buckling upward due to a mine blast. A plate is connected to the lower seat member just behind the legs of the occupant, and the plate swings on a hinge mounted to the lower seat member. In its normal position, the plate forms an acute angle with the floor and a lip of the plate contacts the floor such that the lip curves away from the seat. When the floor buckles upward, the plate swings outward relative to the seat, carrying the occupant's legs with it, thereby avoiding a vertical load transferring from the floor up the occupant's legs to the occupant's knees. Attached to the plate can be a device to limit the swing speed and swing distance of the plate to assure that the plate does not throw the occupant's legs too forcefully or too far.

3 Claims, 2 Drawing Sheets

PRIOR ART

ANTI BLAST SEAT ASSEMBLY WITH KNEE PROTECTION MECHANISM

GOVERNMENT USE

The invention described here may be made, used and licensed by the or for the U.S. Government for governmental purposes without paying me any royalty.

BACKGROUND

An increasingly common battlefield hazard encountered by military vehicles is the land mine. As a consequence, much work is being done to create blast resistant vehicle floors and to create seat assemblies that protect soldiers from shocks caused by mine blasts. Typically during a blast, the floor of the vehicle buckles upward rapidly. If the soldier's feet are then resting on the floor and if the soldier's lower legs are oriented vertically above the feet, then the floor's motion will cause a force transfer up the legs to the soldier's knees. A sufficient force will severely injure the knees. I have developed an improvement to seat assemblies that prevents such a force transfer and thereby protects the soldier's knees.

SUMMARY

My improved seat assembly mounts to the floor of a vehicle and includes lower and upper seat members. Connected to the floor and the lower seat member is a mechanism for absorbing the impact of the vehicle floor as it buckles upward. The assembly includes a plate and is attached by a hinge to the lower seat member. The plate is disposed just behind the legs of the occupant. In its normal position, the plate extends down from the seat toward the floor. But when the floor buckles upward, the plate swings outward relative to the seat, carrying the occupant's legs with it. A pad on the plate cushions the legs when the plate swings. Since the legs are swung upward, no vertical load transfers from the floor up the soldier's legs to the knees and injury to the knees is averted. Preferably there is attached to the plate a device to limit the swing speed and swing distance of the plate so that the plate does not throw the legs too forcefully or too far.

DETAILED DESCRIPTION

Figure 1:
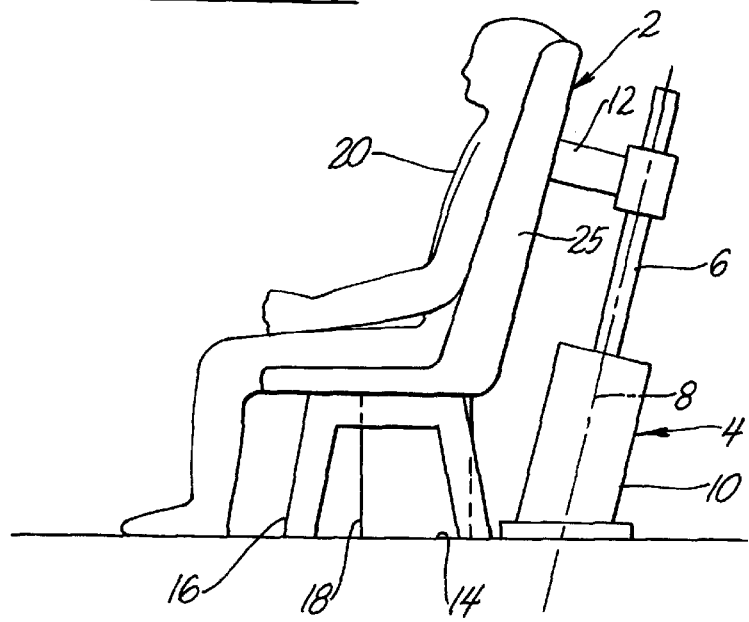
FIG. 1 is a side elevational view of a seat assembly incorporating conventional mechanisms to dampen or absorb shocks.

In FIG. 1 is a military vehicle's seat 2 designed to protect a driver or passenger from the effects of land mines exploding under the vehicle. The force of these explosions deforms vehicle floor 4 upward toward seat 2 and there are a number of conventional mechanisms which absorb or dampen the shock. One such mechanism is a pair of large shock absorbing assemblies similar to that shown at reference numeral 4, whose rod 6 translates along axis 8 relative to cylinder 10. Seat 2 is fixed to rod 6 by collared bracket 12, that engages upper seat member 25, whereby seat 2 moves up and down with the rod. If floor 14 moves upward suddenly, the relative motion between cylinder 10 and rod 6 is dampened, whereby relative motion between seat 2 and floor 14 is also dampened.

Seat 2 may also have a conventional a framework 16 or a conventional support stand 18 on which it is mounted. Framework 16 is designed to plastically deform if floor 14 buckles upward rapidly during a land mine explosion, whereby the framework absorbs shock from the explosion and protects the occupant of seat 3. Support stand 18 can have a honeycomb or cellular internal structure so that the stand will be crushed when floor 14 rapidly buckles upward, whereby support stand 18 protects the seat's occupant 20 in much the same way as framework 16. It will be understood that normally only one of the shock absorbing mechanisms shown in Figure is used in a typical design.

Figure 2:
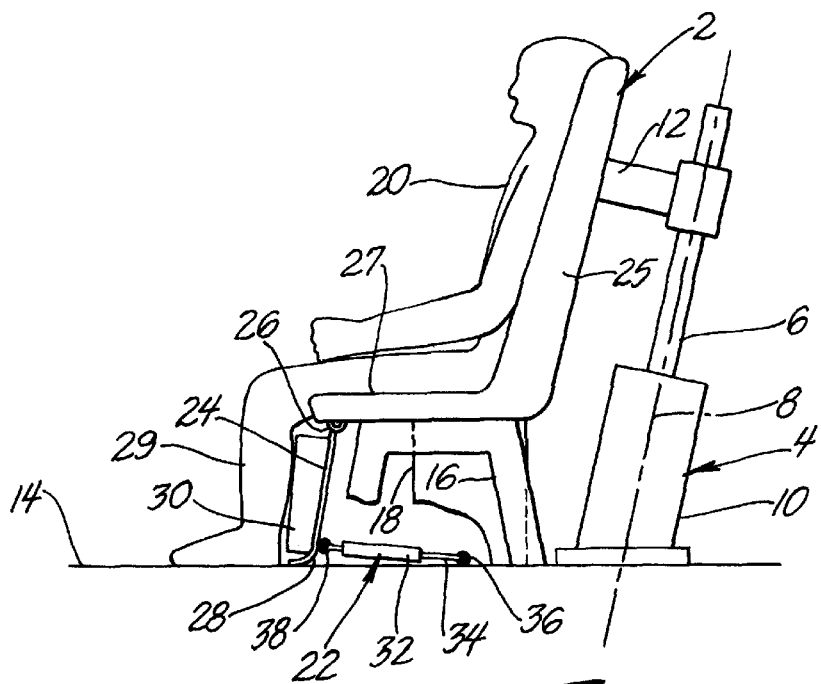
FIG. 2 is a side elevational view of the seat assembly incorporating a first embodiment of my device to protect the soldier's knees.

FIG. 2 shows the elements of FIG. 1 and additionally shows the first embodiment 22 of my knee protection device, portions of framework 18 and support stand 16 being cut away for purposes of illustration. Device 22 includes a swing plate 24 that is tilted relative to floor 14. In FIG. 2, plate 24 has approximately an 80° angle with floor 14, but the degree of tilt can be greater so that the plate forms an angle of, say, 65° with floor 14. The upper end of plate 24 connects to a hinge 26 fixed to the underside of lower seat member 27. The opposite end of plate 24 forms a curved lip 28 that contacts floor 14. Attached to plate 24 and facing occupant's leg 29 is an elastically deformable pad or cushion 30 that can fill most or all the space between leg 29 and plate 24.

Device 22 further includes a hydraulic or pneumatic cylinder 32 that controls the speed at which plate 24 swings out and back. The cylinder has a stroke length that limits the outward swing of the plate. The cylinder has rods 34 connected respectively to one hinge 38 at the base of plate 24 and another hinge 36 mounted to floor 14. The cylinder preferably has a lesser dampening effect when the plate swings up and out from its FIG. 2 position than when the plate swings back to its FIG. 2 position.

When a land mine explodes and floor 14 buckles upward, the floor forces plate 24 to swing forward and out. The plate's swing carries leg 29 and prevents a sudden column load on the leg that that would damage the occupant's knee. Pad 30 absorbs a portion of the force the leg experiences as the plate swings out and cylinder 32 will have already slowed the plate's swing rate. The slowed outward swing rate and limited outward swing travel keep the plate from throwing the occupant's legs into the air. The more greatly retarded return swing speed of plate 24 keeps the plate in a swung-out position during secondary shock effects resulting from the mine blast. For example, one such effect occurs when the vehicle hits the ground after being lifted by a mine blast, and it is preferred that the plate be in the swung-out position when the resulting shock to the occupant occurs.

Figure 3:
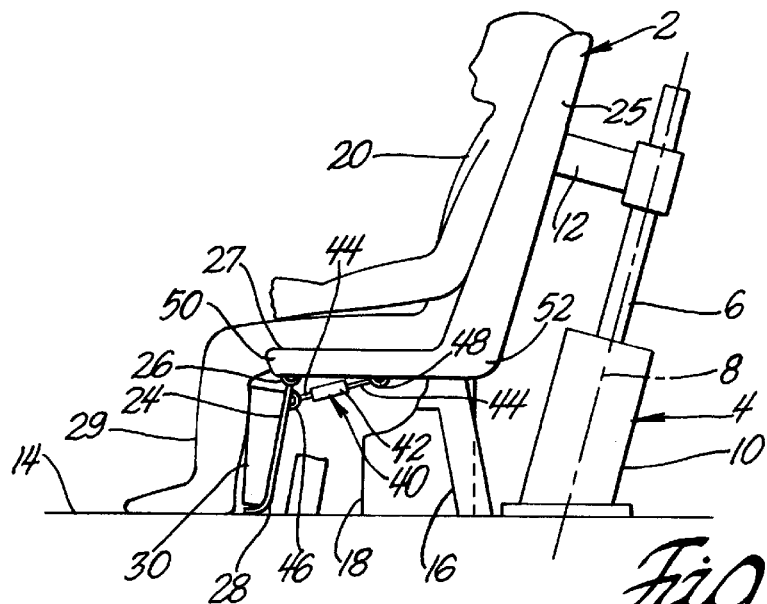
FIG. 3 is a side elevational view of the seat assembly incorporating a second embodiment of my device.

FIG. 3 shows a second embodiment 40 of the knee protection device wherein cylinder 32 is replaced by cylinder 42. Cylinder 42 has the same functions as cylinder 32 in that cylinder 42 retards the outward swing of plate 24 to a greater degree than it retards the plate's swinging inward. Cylinder 42 also limits the outward swing travel of plate 24. However, cylinder 42 is mounted differently in that rods 44 connect respectively to hinge 46 at the upper end of plate 24 and to hinge 48 on the underside of lower seat member 27 about midway between the fore end 50 and aft end 52 thereof. The advantage of the mounting arrangement of cylinder 42 is that the cylinder can be smaller and have a shorter stroke length than cylinder 32, whereby cylinder 42 has a smaller space claim than cylinder 32.

Figure 4:
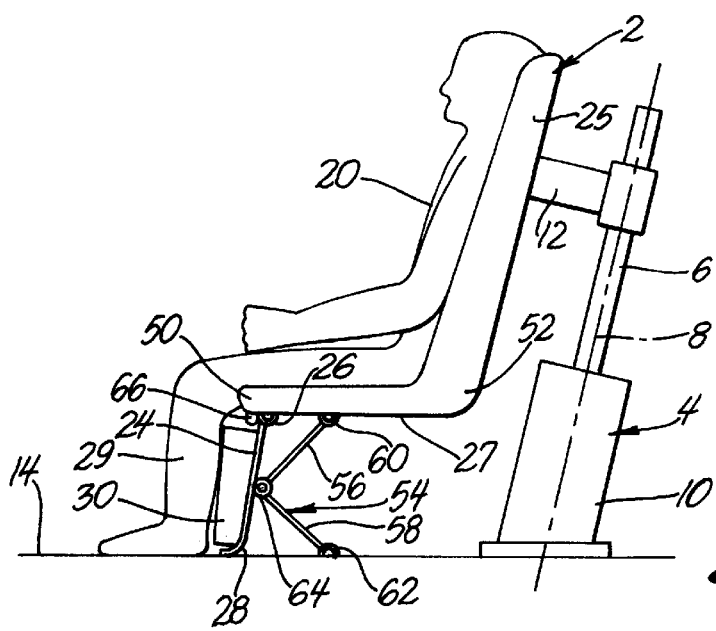
FIG. 4 is a side elevational view of the seat assembly incorporating a third embodiment of my device.

FIG. 4 shows a third embodiment 54 of the knee protection device wherein cylinder 32 is replaced by pivotally mounted rods 56 and 58. Rod 56 is pivotally mounted to the underside of seat member 27 by means of hinge 60 and rod 58 is pivotally mounted to floor 14 by means of hinge 62. Rods 56 and 58 are pivotally connected to each other by hinge 64, which contacts the back of plate 24 but is not attached thereto. Device 54 includes a stop element 66 on the underside of seat element 27 at the fore end 50 thereof, the stop element preferably limiting the swinging out of plate 24 to about 90° from its FIG. 4 position. A sudden upheaval of floor 14 will cause the rods to pivot such that hinge 64 will push plate 24, which will swing out and lift leg 29.

Figure 5:
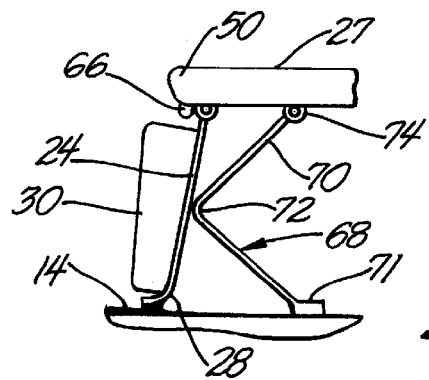
FIG. 5 is a detail view showing a fourth embodiment of my device.

FIG. 5 shows a fourth embodiment 68 of the knee protection device wherein rods 56 and 58 are replaced by a single, flexible, bent rod 70, which may be regarded as a spring. Segment 71 at one end of rod 70 is affixed to floor 14 and the other end of rod 70 is pivotally mounted to the underside of seat member 27 by hinge 74. Rod 70 has an elbow 72, which contacts plate 24, but which is not attached to the plate. A sudden upheaval of floor 14 will cause the rod 70 to collapse such that elbow 72 will push against plate 24 to make the plate swing out and lift leg the occupant's legs.

I wish it to be understood that I do not desire to be limited to the exact details of construction or method shown herein since obvious modifications will occur to those skilled in the relevant arts without departing from the spirit and scope of the following claims.

What is claimed is:

1. In a vehicle designed to survive mines blasting beneath the vehicle, an impact absorbing assembly for protecting a human occupant of the vehicle, comprising:

a seat having a lower seat member and an upper seat member;

a mounting surface in the vehicle; means directly connected to the surface and the seat for absorbing impact energy resulting from mine blasts under the vehicle;

a hinge on the lower seat member;

a plate swingable on the hinge;

means disposed between the seat and the surface for forcing the plate to swing outward from the seat in response to decrease in distance between the seat and the surface, the absorbing means permitting a controlled degree of relative, blast-induced motion of the seat and the surface toward one another;

the plate having a first position where the plate forms an acute angle with the floor and a lower portion of the plate contacts the surface; and the plate having a second position where the plate is swung outward relative to the seat.

2. In a vehicle designed to survive mines blasting beneath the vehicle, an impact absorbing assembly for protecting a human occupant of the vehicle, comprising:

a seat having a lower seat member and an upper seat member;

a mounting surface in the vehicle;

means directly connected to the surface and the seat for absorbing impact energy resulting from mine blasts under the vehicle;

a hinge on the lower seat member;

a plate swingable from the hinge;

means disposed between the seat and the surface for forcing the plate to swing outward from the seat in response to decrease in distance between the seat and the surface;

the plate having a first position where the plate forms an acute angle with the floor and a lower portion of the plate contacts the surface; and the plate having a second position where the plate is swung outward relative to the seat;

wherein the forcing means is comprised of a first rod pivotally connected to the seat, a second rod pivotally connected to the surface, and a hinge connecting the rods together, the hinge being disposed adjacent the plate.

3. In a vehicle, an impact-absorbing assembly to protect a human occupant and the occupant's knees from an impact of a mine blast beneath the vehicle, comprising:

a seat;

a mounting surface in the vehicle beneath the seat;

means connected to the mounting surface and the seat for retarding blast-induced motion of the seat and surface toward each other;

means for protecting the knees from the blast-induced motion;

a hinge of the protecting means on the seat;

a plate of the protecting means pivoted to the hinge and contacting the surface, the plate swinging in response to relative motion of the surface toward the seat.

* * * * *